April 18, 1939. H. HOFER 2,154,938
TRUING DEVICE FOR GRINDING WHEELS
Filed March 4, 1937  2 Sheets-Sheet 1
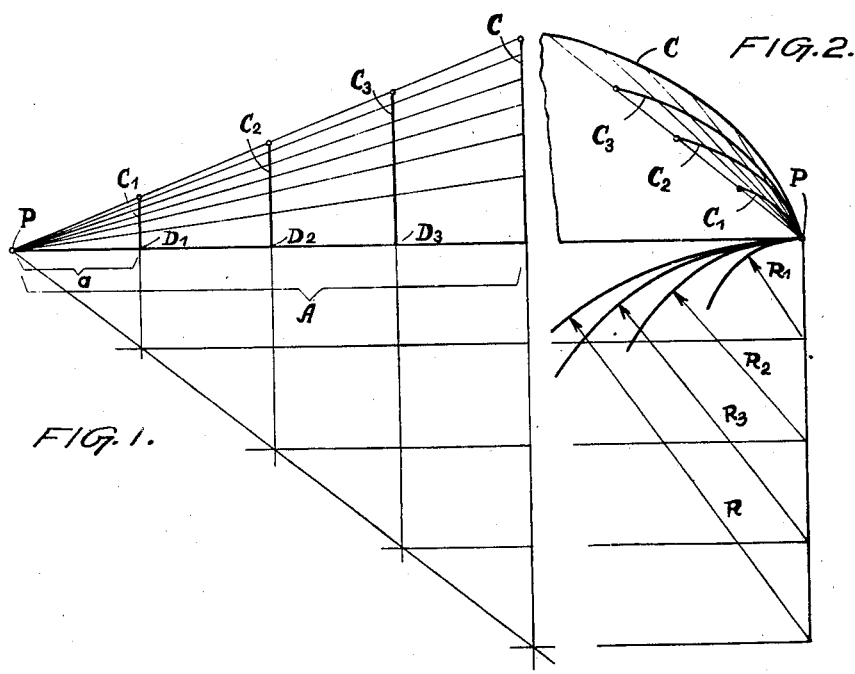

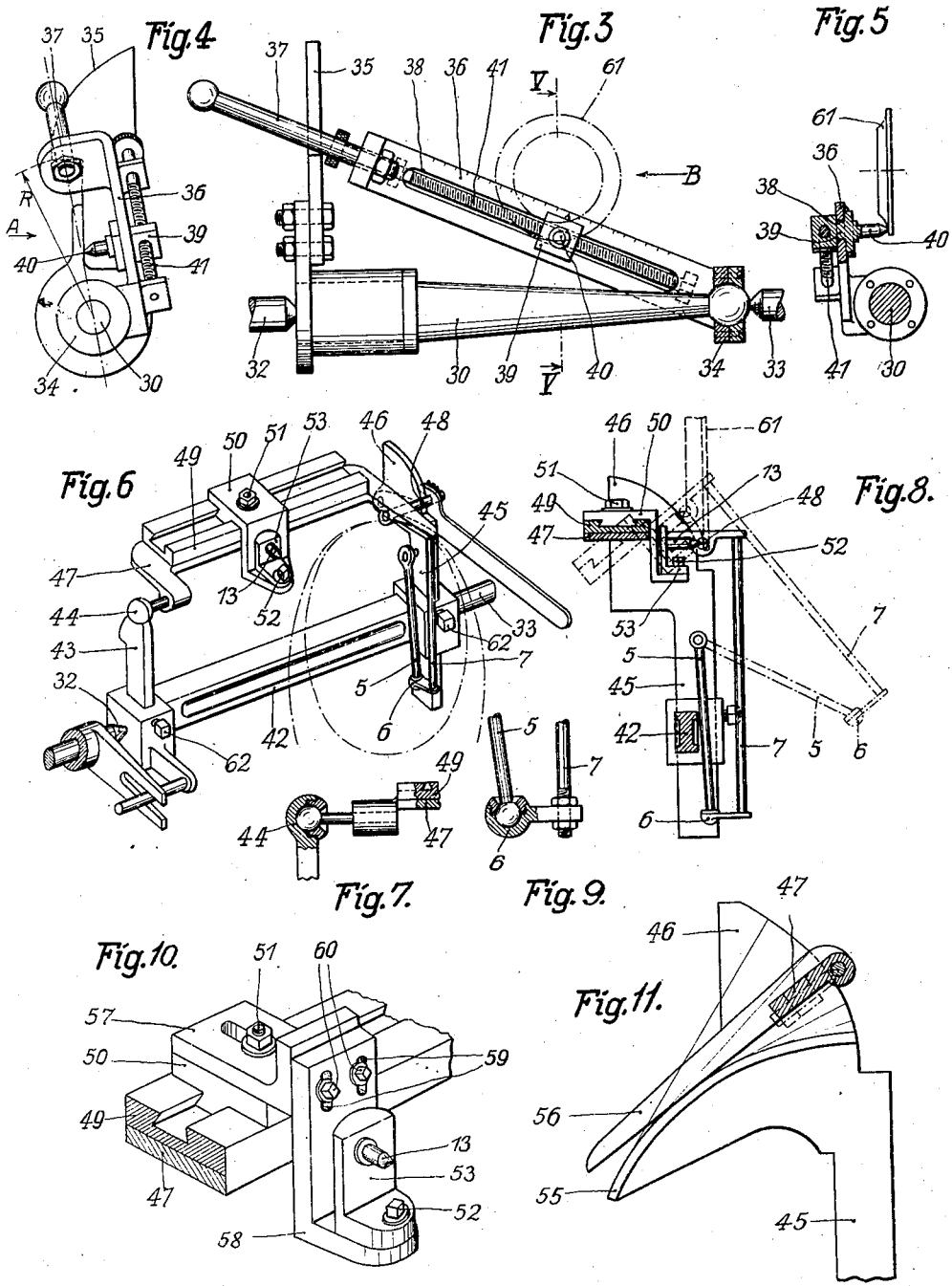

Patented Apr. 18, 1939

2,154,938

UNITED STATES PATENT OFFICE 2,154,938

TRUING DEVICE FOR GRINDING WHEELS

Hermann Hofer, Friedrichshafen-on-the-Bodensee, Germany, assignor to Zahnradfabrik Friedrichshafen Aktiengesellschaft, Friedrichshafen-on-the-Bodensee, Germany Application March 4, 1937, Serial No. 128,890
In Germany March 9, 1936

11 Claims. (Cl. 125—11)

This application was filed in Germany on March 9, 1936.

This invention relates to an improved device for truing the curved working surfaces of pinion wheel grinding discs. For this purpose, for the working movement of the truing tool, a movement guiding device is employed which describes a curve corresponding to the tooth face curvature to be produced and is suitable and adequate for a number of different relative sizes of tooth of wheels to be ground. For this guiding a curve form is employed which produces a theoretically correct truing movement of the tool on the working surface of the grinding disc.

Preferably the improved truing device is so arranged that it can be placed in a toothed wheel grinding machine between the centres thereof in the same place which will be occupied by the pinion wheel to be ground by the grinding disc during the grinding operation.

The object of the invention is to provide a truing device having a gauge guide, corresponding to the tooth curve to be produced, for guiding the truing tool, which tool is adjustable within the area of a sector formed between the two extreme points of the said guide and a fixed pivot, the said sector extending approximately in the direction of the middle axis of the toothed wheel to be worked by the grinding disc.

Further characteristics of the invention are brought out in the following description, drawings and claims.

The drawings illustrate various embodiments of the invention.

Figs. 1 and 2 show diagrammatically the manner of adjustment of the tool in accordance with the invention, Fig. 3 is a view of one embodiment shown in the direction of the arrow A of Fig. 4, in which the adjustment of the curve size and the pertaining tooth radius are effected simultaneously, Fig. 4 is a view in the direction of the arrow B of Fig. 3, Fig. 5 is a section on the line V—V of Fig. 3, Fig. 6 is a view of a modified arrangement corresponding to Figs. 1 and 2 in which the curve size and tooth radius adjustments are effected independently, Fig. 7 is a view to a larger scale than Fig. 6 of a detail, namely one of the ball and socket joints shown in Fig. 6, Fig. 8 is a vertical sectional view of Fig. 6, Fig. 9 is a view to a larger scale than Fig. 6 or 8 of a further detail, Fig. 10 is a detail view of a further modification to an enlarged scale, and Fig. 11 shows a further modification of the arrangement of Fig. 6.

Fig. 1 is a plan showing some rays extending from the pole P to the gauge guide curve C.

Fig. 2 shows the curve C in side view.

The sheaf of rays from the pole or pivot point P to the curve C forming a sector extends with the ray A parallel to the middle axis of the pinion to be ground. The curve C appears in Fig. 1 merely as a line. In practice, however, in the apparatus it is formed as a narrow plate and corresponds in shape to the tooth curve (involute or the like) of the largest tooth wheel to be ground on the grinding disc, that is to say it corresponds to the largest circle having the radius R. This will be seen both from Fig. 1 and Fig. 2. The pole ray A (Fig. 1) represents the tool carrier and the tool or diamond is adjusted so as to produce various curves smaller than the gauge guide curve C. In Figs. 1 and 2 are shown some curves, namely $C_1$, $C_2$, $C_3$ and the radii of the toothed circles to which these various curves pertain. If the truing tool on the pole ray A is brought, for example, into the position $D_1$, then it will describe the curve $C_1$, and corresponding to this curve the whole ray surface, both with the pole P and the guide curve, is adjusted to the tooth radius $R_1$ of the wheel to be ground. The size of the pertaining radius $R_1$ is given by the ratio $R:A = R_1:a$, R being the radius of the large tooth circle to which the gauge guide curve corresponds, and $R_1$ the radius of the tooth circle of the particular toothed wheel to be ground. $a$ is the pole ray from the pole P to the position corresponding to the tooth circle of the wheel to be ground.

It will thus be seen from Figs. 1 and 2 how the truing tool is adjustable in order to describe the curve corresponding to the tooth radius of the wheel to be ground, and which curve is to be reproduced on the working surface of the grinding disc.

The device according to Figs. 3, 4 and 5 consists essentially in a carrying member 30 which is inserted between the centres 32 and 33 in place of the pinion wheel to be ground and which carries fixable and adjustable an involute template 35. At the end opposite the template there is provided a universal or ball joint 34 to which the lever 36 is connected, which lever is guided with a suitably formed projection 37 on the template 35 and carries in a guide slot 38 the holder 39 for the truing tool 40 for truing the grinding disc 61.

The holder is adjustable as desired with respect to the centre point of the ball joint 34 by means of the screw spindle 41 which is carried on the lever 36. The screw spindle 41 has a suitably sufficient automatic locking so as to guarantee the truing tool also remaining in the particular position to which it may have been adjusted at the time. On the swinging of the lever 36 with the guide pin 37 along the involute template 35, the truing tool 40 carries out an involute movement corresponding to the particuar tooth radius of the pinion wheel to be ground.

In the embodiment according to Figs. 6–9, the adjustment of the truing tool on the one hand to the tooth radius of the particular pinion wheel to be ground and on the other hand to the curve size pertaining thereto, is effected separately.

The device consists of the spindle member 42 adapted to be inserted between the centres 32 and 33 in which member 42 is arranged on one side a supporting member 43 which carries a ball joint 44 and which is adjustable and fixable to the tooth radius to be ground. On the other side likewise adjustable and fixable to the tooth radius, is arranged the carrying member 45 for the involute template 46.

The supporting or carrying members 43 and 45 are made of prismatic shape and are guided in slots formed in the spindle member 42 so as to be vertically adjustable. Screws 62 are provided for the purpose of securing the said members 43 and 45 in any desired position of vertical adjustment. A bridge piece 47 is mounted at one end in the said ball joint 44 and at the other end, is slidable over the involute template 46, through the medium of a pin 48. Between the parts 45, 46 and 47 there is provided a special pivot connection through a rod 5 pivoted to the part 45, a ball joint 6 and a rod 7 connected to the part 47. The bridge piece 47 carries a block 50 on which is mounted a holder 53 for the truing tool 13, the block being slidable on the bridge-piece 47 in guide rails 49 for the purpose of enabling the tool 13 to be adjusted to the required tooth curve and is clampable in position by means of a screw or the like.

The holder 53 is swingably and fixably carried on the block 50 by means of a bolt 52. The adjustability of this holder 53 allows of the vertical adjustment of the truing tool 13 on the grinding of helical pinions.

In Fig. 10 is shown how the upper part of the block 50 can be further adjusted transversely of the guide rails 49 and the truing tool 13, moreover, given a vertical adjustment. For this purpose, a plurality of individual carrying members 50, 57 and 58 are provided, the part 58 having a slot 59 so that it can be adjusted to different heights on the part 57 and clamped in the desired position by a screw 60.

A plurality of regularly stepped or graduated involute templates may be employed which templates are in the above device preferably exchangeable. The individual curved guides are so chosen that, corresponding to the tooth circle size range of the individual curves, the degree of adjustment available on the bridge piece 47 for the truing tool is sufficient and the correspondingly correct involute size is constantly producible within the given limits. The circles shown in dotted lines in Fig. 5 indicate respectively the tooth circle of the largest tooth wheel and of the smallest tooth wheel, which can be worked on the grinding machine and thus indicate the possible range of adjustment for the truing tool with the use of the template 46.

In accordance with the invention, the truing tool may be adjusted into the correct vertical position to the tangent on the guide curve for example in the manner shown in Fig. 11. In this case, an auxiliary tooth circle 55 is provided adjacent the involute template 46 on the part 45 on which circle 55 a straight line 56, connected to the bridge 47, can be rolled.

The truing tool in all the devices hereinbefore described is preferably, as shown, swung by hand, but it will be understood that it may, if desired, be actuated mechanically.

I claim:

1. In a device for truing the curved working surface of grinding discs for grinding toothed gears, the sub-combination of: a fixed pivot; a fixed curved gauge guide; a link mechanism associated with said guide and having a lever turnable on said pivot; a truing tool operatively associated with said link mechanism; and means for adjusting said tool on said link mechanism within a sector corresponding to the two extreme positions of said tool relatively to said fixed pivot as determined by said fixed curved guide said sector extending approximately in the direction of the middle axis of the gear to be ground.

2. In a device for truing the curved working surface of grinding discs for grinding toothed gears, the sub-combination of: a fixed pivot; a fixed curved gauge guide; a link mechanism associated with said guide and having a lever turnable upon said pivot; a truing tool operatively associated with said link mechanism and means for simultaneously adjusting said tool to the tooth radius of a gear to be ground and to the curve size pertaining thereto within a sector corresponding to the two extreme positions of said tool relatively to said fixed pivot as determined by said fixed curved guide said sector extending approximately in the direction of the middle axis of the gear to be ground.

3. In a device for truing the curved working surface of grinding discs for grinding toothed gears having involute profile, the sub-combination of: a fixed pivot; a fixed involute curved gauge guide; a link mechanism associated with said guide and having a lever turnable upon said pivot; a truing tool operatively associated with said link mechanism; and means for adjusting said tool within a sector corresponding to the two extreme positions of said tool relatively to said fixed pivot, as determined by said fixed involute curved guide said sector extending approximately in the direction of the middle axis of the gear to be ground.

4. In a device for truing the curved working surface of grinding discs for grinding toothed gears, the sub-combination of: a fixed pivot arranged on the axis of a pinion to be ground; a fixed curved gauge guide, spaced from and arranged perpendicularly to said axis; a link mechanism associated with said guide and having a lever turnable on said pivot; a truing tool operatively associated with said link mechanism; and means for adjusting said tool on said link mechanism within a sector corresponding to the two extreme positions of said tool relatively to said fixed pivot as determined by said fixed curved guide said sector extending approximately in the direction of the middle axis of the gear to be ground.

5. In a device for truing the curved working surface of grinding discs for grinding toothed gears, the sub-combination of: a fixed pivot; a fixed curved gauge guide; a link mechanism associated with said gauge guide and having a lever turnable upon said pivot; a truing tool operatively associated with said link mechanism; means for adjusting said tool to a given tooth radius and independent means for adjusting said tool within a sector corresponding to the two extreme positions of said tool relative to said fixed pivot as determined by said fixed curved guide said sector extending approximately in the direction of the middle axis of the gear to be ground.

6. In a device for truing the curved working surface of grinding discs for grinding toothed gears, the sub-combination of: a spindle member connectible between the centres of a grinding machine; a supporting member located at one end of said spindle member; means for adjusting and positioning said supporting member on a tooth radius of a gear to be ground; a second support located at the other end of said spindle member; means for adjusting and positioning said support on said tooth radius; a curved gauge guide carried by said last-mentioned support; a ball joint pivot located on said first-mentioned support; a bridge-piece carried by said ball joint; a pin projecting from said bridge-piece, said pin bearing on said curved guide; a displaceably mounted tool holder carried by said bridge-piece; and means for moving said pin over said curved guide to produce a corresponding movement of said tool holder and means for adjusting the position of said tool holder within a sector corresponding to the two extreme positions of said tool holder relatively to said pivot as determined by said curved guide said sector extending approximately in the direction of the middle axis of the gear to be ground.

7. In a device for truing the curved working surface of grinding discs for grinding toothed gears, the sub-combination of: a fixed pivot; an exchangeable fixed curved gauge guide; a link mechanism associated with said guide and having a lever turnable on said pivot; a truing tool operatively associated with said link mechanism; and means for adjusting said tool on said link mechanism within a sector corresponding to the two extreme positions of said tool relatively to said fixed pivot as determined by said fixed curved guide said sector extending approximately in the direction of the middle axis of the gear to be ground.

8. In a device for truing the curved working surface of grinding discs for grinding bevelled tooth gears, the sub-combination of: a fixed pivot; a fixed curved gauge guide: a link mechanism associated with said guide and having a lever turnable on said pivot; a truing tool operatively associated with said link mechanism; and means for adjusting said tool on said link mechanism within a sector corresponding to the two extreme positions of said tool relatively to said fixed pivot as determined by said fixed curved guide said sector extending approximately in the direction of the middle axis of the gear to be ground; and independent means for adjusting said tool perpendicularly to the tangent to said gauge guide.

9. In a device for truing the curved working surface of grinding discs for grinding toothed gears, the sub-combination of: a spindle member connectible between the centres of a grinding machine; a support located at one end of said spindle member; means for adjusting and positioning said support at the tooth radius of a gear to be ground; a second support located at the other end of said spindle member; means for adjusting and positioning said support to said tooth radius; an involute template carried by said last-mentioned support; a pivot on said first-mentioned support; a member connected at one end to said pivot and engaging said template at the other end; a longitudinally slidably mounted block carried by said member; a transversely movably mounted plate on said block; a vertically adjustably mounted tool holder carried by said plate; a truing tool carried by said holder; and means for displacing said member over said template to cause said tool to describe the required curve movement.

10. In a device for truing the curved working surface of grinding discs for grinding toothed gears, the sub-combination of: a spindle member connectible between the centres of a grinding machine; a supporting member located at one end of said spindle member; means for adjusting and positioning said supporting member on a tooth radius of a gear to be ground; a second support located at the other end of said spindle member; means for adjusting and positioning said support on said tooth radius; a curved gauge guide carried by said last-mentioned support; a ball joint pivot located on said first-mentioned support; a bridge-piece carried by said ball joint; a pin projecting from said bridge-piece, said pin bearing on said curved guide; a displaceably mounted tool holder carried by said bridge-piece; and means for moving said pin over said curved guide to produce a corresponding movement of said tool holder; and means for adjusting the position of said tool holder within a sector corresponding to the two extreme positions of said tool holder relatively to said pivot as determined by said curved guide said sector extending approximately in the direction of the middle axis of the gear to be ground; an auxiliary tooth circle member connected to said gauge guide and a ruler device connected to said bridge-piece and contacting said circle member whereby on movement of said tool, said ruler will roll on said circle member and maintain said tool perpendicular to the tangent of said gauge guide.

11. In a device for truing the curved working surface of grinding discs for grinding bevelled toothed gears, the sub-combination of: a fixed pivot; a fixed curved gauge guide; a truing tool holder; a truing tool carried by said holder; means for swinging said tool in said holder so that the axis thereof approximately cuts the axis of the grinding disc; a link mechanism associated with said guide and having a lever turnable upon said pivot; and means for adjusting said tool within a sector corresponding to the two extreme positions of said tool relatively to said fixed pivot as determined by said fixed curved guide said sector extending approximately in the direction of the middle axis of the gear to be ground.

HERMANN HOFER.